United States Patent [19]

Sandiford

[11] 4,069,869

[45] Jan. 24, 1978

[54] PLUGGING HIGH PERMEABILITY ZONES OF RESERVOIRS HAVING HETEROGENEOUS PERMEABILITY

[75] Inventor: Burton B. Sandiford, Placentia, Calif.

[73] Assignee: Union Oil Company of California, Los Angeles, Calif.

[21] Appl. No.: 767,844

[22] Filed: Feb. 11, 1977

[51] Int. Cl.$^2$ .................... E21B 33/138; E21B 43/22
[52] U.S. Cl. ..................................... 166/270; 166/294
[58] Field of Search .............................. 166/292–295, 166/273, 274, 270

[56] References Cited

U.S. PATENT DOCUMENTS

| 3,386,509 | 6/1968 | Froning ................. 166/292 |
| 3,396,790 | 8/1968 | Eaton .................... 166/270 |
| 3,656,550 | 4/1972 | Wagner, Jr. et al. ........ 166/270 |
| 3,741,307 | 6/1973 | Sandiford et al. ........ 166/292 X |
| 3,749,172 | 7/1973 | Hessert et al. ........... 166/270 X |
| 3,908,760 | 9/1975 | Clampitt et al. ......... 166/270 X |
| 3,926,258 | 12/1975 | Hessert et al. .......... 166/295 X |
| 3,981,363 | 9/1976 | Gall ...................... 166/270 |
| 4,004,639 | 1/1977 | Sandiford ............... 166/292 |
| 4,009,755 | 3/1977 | Sandiford ............... 166/273 X |
| 4,031,958 | 6/1977 | Sandiford et al. ........ 166/270 |

Primary Examiner—Stephen J. Novosad
Attorney, Agent, or Firm—Richard C. Hartman; Dean Sandford; Gerald L. Floyd

[57] ABSTRACT

A method of forming a mixed plug in the more permeable zones of a subterranean reservoir of nonuniform permeability in which there is injected into the reservoir aqueous solutions of: a polymer, a material that reacts with the polymer to form a time-delayed polymer-containing plug, an alkali metal silicate and a material that reacts with the silicate to form a time-delayed silicate-containing plug. The injected solutions are either admixed at the surface prior to injection or are simultaneously injected so that a mixed polymer-silicate plug is formed in the reservoir.

30 Claims, No Drawings

PLUGGING HIGH PERMEABILITY ZONES OF RESERVOIRS HAVING HETEROGENEOUS PERMEABILITY

BACKGROUND OF THE INVENTION

1. Field of the Invention

This invention relates to a method of plugging of the more permeable strata of subterranean reservoirs having non-uniform permeability. More particularly, the invention relates to such a method to provide better control of fluids injected into a reservoir during enhanced oil recovery operations or withdrawn from a reservoir during production operations.

2. Description of the Prior Art

When fluids flow through reservoirs having sections of varying permeability, a higher percentage of the fluids tends to flow through those sections having a higher permeability. It is often desired to decrease or stop the flow of fluids through these sections of higher permeability. For example, in the enhanced recovery of petroleum by flooding, a displacing fluid is injected into the reservoir via an injection well to displace the petroleum through the reservoir toward a producing well.

In the normal flooding operation, maximum oil recovery is obtained when the driven fluid builds up in a wide band in front of the driving fluid which moves uniformly towards the producing well. To keep this bank of oil intact, and constantly moving towards the producing well, a substantially uniform permeability must exist throughout the reservoir. If this uniform permeability does not exist, or is not provided, the flooding fluid will seek the areas of high permeability, and channeling occurs with the consequent loss of some driving fluid energy and the appearance of excessive amounts of driving fluid in the producing well.

There is a tendency for the injected fluid to follow the path of least resistance, pass mostly through the portions of the reservoir having the highest permeability and bypass the petroleum present in the less permeable portions of the reservoir. If these high permeability zones of the reservoir were plugged, the injected fluid would be forced to flow into the less permeable portions of the reservoir and displace a higher percentage of the petroleum present in the entire reservoir. Similarly, in the production of oil, producing wells sometimes produce water and/or gas along with oil. The water and gas often are produced through the portions of the reservoir having a relatively high permeability. If the zones through which water and gas are produced could be at least partially plugged, a higher percentage of the produced fluids would be the desired oil phase.

A wide variety of materials have been proposed for use in plugging subterranean reservoirs. Plugging by injection of a solution of a polymer solution and a solution of a material, such as a multivalent metal cation, which reacts with the polymer to form a gel, agglomerate, precipitate or other plug is shown in U.S. Pat. Nos. 3,396,790 to Eaton, 3,799,262 to Knight, 3,581,824 to Hurd, 3,762,476 to Gall, 3,909,423 to Hessert et al., 3,795,276 to Eilers et al., 3,658,129 to Lanning et al. and 3,809,160 to Routson. Injection of a solution of an alkali metal silicate and a solution of a material which reacts with the silicate to form a gel or a plug is well-known as shown in many patents, such as U.S. Pat. Nos. 3,530,937 to Bernard, U.S. Pat. No. 3,386,509 to Froning and 3,402,588 to Andresen. U.S. Pat. No. 3,741,307 to Sandiford et al. describes injection of a thickened aqueous polymer solution followed by a solution of a liquid agent which reacts in the reservoir to form a plugging material. An example of suitable reactants include sodium silicate and a delayed gelling agent therefor, such as ammonium sulfate. Another approach has been to produce a double plug. Thus, U.S. Pat. No. 3,306,870 to Eilers et al. discloses injecting an aqueous solution of an acrylamide polymer and a material which reacts with the polymer to form a first plug. The composition may be preceded or followed by a slurry of an expansive hydraulic cement which reacts in the reservoir to form a second plug.

U.S. patent application Ser. No. 667,694 filed Mar. 17, 1976 by Burton B. Sandiford, now U.S. Pat. No. 4,009,755, describes the formation of a combination plug by injecting into a reservoir a polymer and a material that reacts with the polymer to form a polymer-containing plug and an alkali metal silicate and a material which reacts with the silicate to form a separate silicate-containing plug.

In spite of the wide variety of plug-forming compositions and methods previously suggested, need remains for even more effective plugging materials, especially for use in reservoirs having channels or zones of high permeability which are especially difficult to seal off. The flow rate of enhanced oil recovery fluids through these high permeability channels is often as high as 0.1 mile per hour and in some instances may be as high as 0.5 mile per hour or higher. At these high flow rates, it is difficult to design a plugging method wherein the plugging material remains fluid and pumpable long enough to enable it to be properly positioned in the channel, yet sets up within a relatively short time to form a firm plug. This is especially true when the channel exists between wells which are a relatively short distance apart, for example 500 feet.

Accordingly, a principal object of this invention is to provide a method for controlling the permeability of a subterranean reservoir of nonuniform permeability.

Another object of the invention is to provide a method for reducing channeling of a flooding medium from an injection well to a producing well via a zone of high permeability.

Still another object is to provide a method for selectively plugging water-producing zones in a subterranean reservoir.

A further object is to plug especially onerous and difficult to plug high permeability channels in a subterranean reservoir.

A still further object is to provide a mixture of two plugging materials for plugging high permeability channels in a subterranean reservoir.

Other objects, advantages and features of the invention will become apparent from the following description and appended claims.

SUMMARY OF THE INVENTION

A method of plugging the more permeable zones of a subterranean reservoir penetrated by a well to control the path of flow of fluids through the reservoir in which there is injected or introduced into the reservoir aqueous solutions or dispersions of: (1) a polymer, (2) a material that reacts with the polymer within the reservoir to produce a polymer-containing plug, (3) an alkali metal silicate, and (4) a material that reacts with the silicate within the reservoir to form a silicate-containing plug. The plug-forming components are injected in a manner such that they are mixed when in the reservoir, i.e., either all four components are premixed at the surface prior to injection, or any two or more of the components are premixed at the surface and injected in small slugs simultaneously with slugs of the remaining components which also may be premixed or injected separately, or all four components are injected separately and simultaneously. When two or more separate slugs are injected simultaneously, the mixing occurs during the passage of the slugs down the well and out into the reservoir so that the desired single mixture exists in the reservoir.

DETAILED DESCRIPTION OF THE INVENTION

In the plugging of the more permeable zones of a subterranean reservoir having highly heterogeneous permeability according to the method of this invention, there is positioned in the reservoir a single mixture containing a polymer, a material that reacts with the polymer to produce a polymer-containing plug, an alkali metal silicate and a material that reacts with the silicate to produce a silicate-containing plug. Thus, two groups of aqueous solutions, each group of which contains two reactants, each pair of reactants being capable of reacting to form individual plugs upon mixing, react to form a single plug containing both polymer and silicate.

The aqueous polymer solution employed in the treatment of this invention is a dilute solution of a water-soluble or water-dispersible polymer in fresh water or brine, whose setting or gellation can be time-delayed. A number of water soluble polymers are known to form viscous aqueous polymer solutions when dissolved therein in relatively dilute concentrations. Exemplary water-soluble polymeric materials that can be employed are relatively high molecular weight acrylic acid-acrylamide copolymers, polyacrylamides, partially hydrolyzed polyacrylamides, polyalkyleneoxides, carboxyalkylcelluloses, hydroxyethylcelluloses and heteropolysaccharides obtained by the fermentation of starchderived sugar.

Many of the water-soluble polymers useful in the practice of this invention are characterized by a viscosity of at least 3 centipoises for a 0.1 percent by weight solution thereof in aqueous 3 percent by weight sodium chloride solution at 25° C. as determined with a Brookfield viscometer equipped with a UL adapter and operated at a speed of 6 r.p.m. However, it is to be recognized that other of the water-soluble polymers, such as certain polyacrylamides and polyalkyleneoxides, are effective in reducing the mobility of water in porous media, yet have little or only slight effect upon the viscosity of water or brine.

The polyacrylamide and partially hydrolyzed polyacrylamide which can be used in this invention include the commercially available, water-soluble, high molecular weight polymers having molecular weights in the range of above about $0.2 \times 10^6$, preferably from $0.5 \times 10^6$ to $40 \times 10^6$, and more preferably from $3 \times 10^6$ to $10 \times 10^6$. The hydrolyzed polyacrylamides have up to about 70 percent of the carboxamide groups originally present in the polyacrylamide hydrolyzed to carboxyl groups. Preferably from about 12 to about 45 percent of the carboxamide groups are hydrolyzed to carboxyl groups. Hydrolysis of the acrylamide polymer is accomplished by reacting the same with sufficient aqueous alkali, e.g., sodium hydroxide, to hydrolyze the desired number of amide groups present in the polymer molecule. The resulting products consist of a long hydrocarbon chain, with some carbon atoms bearing either amide or carboxyl groups. Copolymerization of acrylic acid and acrylamide according to well known procedures produces acrylic acid-acrylamide copolymers. The term "hydrolyzed polyacrylamide", as employed herein, is inclusive of the modified polymers wherein the carboxyl groups are in the acid form and also of such polymers wherein the carboxyl groups are in the salt form, provided that the salts are water-soluble. Alkali metals and ammonium salts are preferred. A number of polyacrylamides and partially hydrolyzed acrylamide polymers and acrylic acid-acrylamide copolymers suitable for use in this invention are commercially available; for example, WC-500 polymer marketed by Calgon Corporation of Pittsburgh, Pa., Pusher 700 polymer marketed by The Dow Chemical Company of Midland, Michigan, Q-41-F polymer marketed by Nalco Chemical Company of Oak Brook, Illinois and Cyantrol 940 polymer marketed by American Cyanamid of Wallingford, Connecticut.

Especially useful in the practice of this invention are the partially cationic polyacrylamides, the partially anionic polyacrylamides and mixtures thereof. A partially cationic polyacrylamide is a nonionic polyacrylamide which contains a cationic co-monomer, such as an alkylene polyamine, a quaternary ammonium chloride or amine hydrochloride, for example trimethyl octyl ammonium chloride, trimethyl stearyl ammonium chloride, oleyl trimethyl ammonium chloride, oleyl amine diethylamine hydrochloride and dimethylaminopropylamine. A partially anionic polyacrylamide can be a nonionic polyacrylamide which has been partially hydrolyzed to convert some of the acrylamide groups to acrylic groups, the alkali metal salts of which are anionic. Introducing sulfate or sulfonate groups into the polyacrylamide molecule also imparts an anionic character to the molecule. Polymer 1160 is a 20 percent by weight cationic, 80 percent nonionic copolymer marketed by Betz Laboratories, Inc. of Trevose, Pa. Polymer 1120 and Hi Vis polymer are 35 percent anionic, 65 percent nonionic polyacrylamides which have been partially hydrolyzed to the extent of 35 percent. These polymers are also marketed by Betz Laboratories, Inc.

The operable polyalkeneoxides have molecular weights in the range of from about $10^5$ to about $10^8$, preferably from $10^6$ to $10^7$ and most preferably from $3 \times 10^6$ to $10 \times 10^6$. By "polyalkeneoxide" is meant herein any of the polymeric watersoluble resins prepared by homopolymerization of a single alkene oxide, for example ethylene oxide, propylene oxide or butylene oxide. It is preferred to employ the homopolymer of polyethylene oxide. This product is marketed by Union Carbide Chemicals Company under the trademark "Polyox". Mixed polyalkeneoxides, made by heteropolymerization of more than one alkene oxide in either a random or block polymerization, may also be employed.

Also suitable for use in this invention are the alkali metal or ammonium salts of a carboxyalkylcellulose, such as carboxymethylcellulose. Carboxymethylcellulose may be represented by the formula:

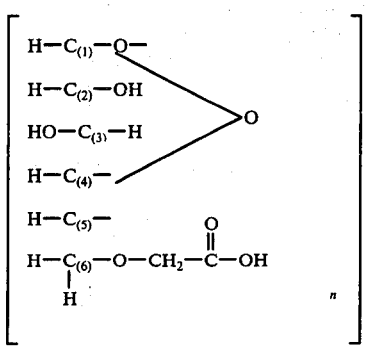

where *n* is a whole number greater than one, and the carboxymethyl anhydroglucose units are connected together by oxygen bridges between carbon atom (1) of one unit and carbon atom (4) of another unit. A salt of carboxymethylcellulose is carboxymethylcellulose wherein the H at the end of the carboxymethyl group in one or more of the carboxymethyl and anhydroglucose units is replaced by a cation. In any molecule or group of molecules of carboxymethylcellulose, each anhydroglucose unit need not necessarily contain a carboxymethyl group although one or more anhydroglucose units may possibly contain up to three carboxymethyl groups, the additional carboxymethyl groups being substituted for the H's of the OH groups on carbon atoms (2) and (3). As used herein, the term "carboxymethylcellulose" is defined as any carboxymethylcellulose having a degree of substitution less than one wherein the number of anhydroglucose units exceeds the number of carboxymethyl groups. Commercial grades of carboxymethylcellulose have a degree of substitution ordinarily between 0.5 and 0.9.

Hydroxyethylcellulose can be prepared from shredded wood pulp which has been soaked in 30 weight percent sodium hydroxide for about 20 hours. The resultant alkali cellulose is reacted with either ethylene oxide or ethylene chlorohydrin until a sufficient number of ethylene groups per glucose unit have been combined. The water-soluble form of hydroxyethylcellulose useful in this invention has a substitution (hydroxyethyl groups per glucose unit) greater than about 0.5, and preferably from 1.0 to 2.0. This is in contrast to the alkalisoluble form of hydroxyethylcellulose which has a substitution less than about 0.3. Generally, about 4 to 5 hours are required at about 40° C. for complete reaction of the alkali cellulose with the ethylene compound to produce a water-soluble hydroxyethylcellulose. The product is available commercially as either a solid fibrous material or in the form of aqueous solutions having up to about 10 weight percent hydroxyethylcellulose and viscosity ranges from about 10 to 1200 centipoises. A very high molecular weight hydroxyethylcellulose suitable for use in this invention is marketed by Hercules Inc. under the trademark Natrosol 250. Another suitable hydroxyethylcullose is marketed by the Union Carbide Chemicals Company under the trademark Cellosize.

A particularly useful water-soluble cellulose ether is carboxymethylhydroxyethylcellulose, CMHEC, in which part of the carboxymethyl groups of carboxymethylcellulose are replaced with hydroxyethyl groups following well-known procedures. It is preferred that the carboxymethyl degree of substitution be at least 0.4. The degree of hydroxyethyl substitution is less important and can vary widely, e.g., from about 0.1 to 0.4 or higher. A suitable CMHEC is marketed by Hercules Inc. under the trademark SPX 5338.

The heteropolysaccharides which may be used in carrying out the present invention are ionic polysaccharides produced by fermentation of carbohydrates by bacteria of the genus Xanthomonas. Examples of such heteropolysaccharides are those produced by *Xanthomonas campestris, Xanthomonas begonia, Xanthomonas phaseoli, Xanthomonas hederae, Xanthomonas incanae, Xanthomonas carotae* and *Xanthomonas translucens*. Of these, ionic polysaccharide B-1459 is preferred. The polysaccharide B-1459 is prepared by culturing the bacterium *Xanthomonas campestris* NRRL B-1459, United States Department of Agriculture, on a well-aerated medium containing commercial glucose, organic nitrogen sources, dipotassium hydrogen phosphate and various trace elements. Fermentation is carried to completion in four days or less at a pH of about 7 and a temperature of 28° C. Polysaccharide B-1459 is available under the trademark Kelzan MF marketed by Kelco Company of San Diego, California. Production of this heteropolysaccharide is well described in Smiley, K. L. "Microbiol Polysaccharides—A Review". *Food Technology* 20, 9:112–116 (1966) and Moraine, R. A., Rogovin, S. P. and Smiley, K. L. "Kinetics of Polysaccharide B-1459 Synthesis", *J. Fermentation Technology* 44, 311–312 (1966).

The selected water-soluble polymer is admixed with water or brine to provide a relatively dilute aqueous solution of the polymer that exhibits a sufficiently reduced mobility when injected into the porous media to divert subsequently injected fluids to the less permeable channels. Preferably, the polymer is dissolved in fresh water since the mobility reduction effect of most of these polymers is inhibited by the presence of substantial quantities of dissolved salts. However, it is sometimes desirable to employ oil-field brine or other water containing relatively high dissolved salt contents, particularly where the reservoir into which they are to be injected is water-sensitive or where fresh water is not available. In most instances, the mobility of the water can be reduced to the desired level by the addition of about 0.001 to about 1 weight percent of the polymer, and satisfactory results can often be obtained by the addition of 0.05 to 0.15 weight percent of polymer.

The material which reacts with the polymer within the reservoir to produce a polymer-containing plug can be any one or a mixture of a number of materials. Generally such materials are those which at least partially cross-link the polymer to form a gelatinous precipitate. Suitable cross-linking agents used in an amount sufficient to promote cross-linking of the polymer include mixtures of a compound of a multivalent metal and a reducing agent, or a low molecular weight water-soluble aldehyde, or a colloidal hydroxide of a multivalent cation. Mixtures of the various types of cross-linking agents may also be used.

Where the cross-linking agent is a mixture of a compound of a multivalent metal and a reducing agent, suitable multivalent metal compounds are water-soluble compounds of polyvalent metals wherein the metal is present in a valence state which is capable of being reduced to a lower valence state. Examples of such compounds include potassium permanganate, sodium permanganate, ammonium chromate, ammonium dichromate, the alkali metal chromates, the alkali metal dichromates, chromic acetate, chromic citrate, chrome alum and chromium trioxide. Chromic acetate, sodium dichromate and potassium dichromate are preferred because of their efficiency and ready availability. The hexavalent chromium in the chromium compounds is reduced in situ to trivalent chromium by suitable reducing agents, as discussed hereinafter. In the permanganate compounds, the manganese is similarly reduced from +7 valence to +4 valence as in $MnO_2$. As a general rule, there is used from 0.05 to 60, preferably 0.5 to 30, weight percent multivalent metal-containing compound based on the amount of polymer used. Stated another way, the amount of the starting multivalent metal-containing compound used will usually be an amount sufficient to provide at least about $3 \times 10^{-6}$, preferably at least $3 \times 10^{-5}$, gram atoms of said metal capable of being reduced per gram of polymer. Preferably, the amount of said metal capable of being reduced which is used will not exceed $4 \times 10^{-3}$, more preferably $2 \times 10^{-3}$, gram atoms of said metal per gram of polymer.

Suitable reducing agents which can be used in this combination include sulfur-containing compounds such as sodium sulfite, sodium hydrosulfite, sodium metabisulfite, potassium sulfite, sodium bisulfite, potassium metabisulfite, sodium sulfide, sodium thiosulfate, ferrous sulfate, thioacetamide, hydrogen sulfide and others. Nonsulfur-containing reducing agents which may be used include hydroquinone, ferrous chloride, p-hydrazinobenzoic acid, hydrazine phosphite, hydrazine dichloride and the like. The most preferred reducing agents are sodium hydrosulfite and potassium hydrosulfite. The amount of reducing agent used will generally be within the range of from 0.1 to at least 150, preferably at least about 280, weight percent of the stoichiometric amount required to reduce the metal in the starting multivalent state to the lower valence state, e.g., +6 Cr to +3 Cr.

When a low molecular weight water-soluble aldehyde is used as the cross-linking agent, formaldehyde, paraformaldehyde or glyoxal may be used as well as derivatives thereof, such as hexamethylenetetramine, which can produce formaldehyde or glyoxal in an acidic solution. Aldehydes will cross-link the water-soluble polymers at a pH of about 3 or lower. Generally, the more acid the pH, the more rapid the cross-linking. The amount of the aldehyde cross-linking agent can be varied from about 0.01 percent to about 50 percent based on the weight of the polymer present in the aqueous solution.

When the cross-linking agent is a water-soluble salt of a polyvalent cation which reacts in solution to form a colloidal hydroxide, there is utilized a polyvalent ion, such as aluminum, chromium, copper, iron, cadmium, cobalt, manganese, nickel, tin or zinc in the form of water-soluble salts, such as sulfates, chlorides, acetates, citrates and the like at a pH sufficiently low to retain the ions in solution. The reservoir contacted by the treating solution acts as a buffer in that it gradually raises the pH, thereby precipitating the hydroxide of the above-mentioned ions which react with the polymer. Generally an aqueous solution containing from 0.005 to 5.0 weight percent of inorganic ion based on the weight of polymer can be used.

The composition used to form the other time-delayed plugging material used in the process of this invention is an aqueous liquid mixture of two or more reactive chemical agents which react in the reservoir to form a precipitate or gel. One reactive chemical agent is an alkali metal silicate. The other reactive chemical agent is a gelling agent for the alkali metal silicate. Sodium silicate is the most commonly used alkali metal silicate. The gelling agent can be an acid or an acid-forming compound, a water-soluble ammonium salt, a lower aldehyde, an aluminum salt or an alkali metal aluminate. Exemplary gelling agents are sulfuric acid, hydrochloric acid, ammonium sulfate, ammonium bicarbonate, formaldehyde, aluminum sulfate and sodium aluminate. The silicate reacts in the presence of the gelling agent to form a silica or silica alumina gel. It is well known that the gelling of sodium silicate in the presence of these gelling agents is delayed, i.e., gelling occurs at some time after the silicate and gelling agent are admixed. It is preferred that the conditions be selected in accordance with known techniques to delay gelling of the sodium silicate for a period sufficient to permit its injection into the reservoir immediately adjacent the well, but yet not for a period that would unduly prevent continuance of normal well operations. Thus, in most cases, it is preferred that the conditions be selected so that gelling is delayed for about two hours, and is subsequently completed within about 24 hours.

The concentration of alkali metal silicate in the plugging solution can vary over a wide range, e.g., from about 1 to 30 weight percent. However, weaker plugs are formed at the more dilute concentrations and costs are often excessive at higher concentrations. Thus, it is preferred that the alkali metal silicate concentration of the plugging solution injected into the reservoir be between about 3 and 15 weight percent and preferably between about 3 and 10 weight percent. The ratio of silica to alkali metal oxide in the silicate can also vary within limits from about 1.5 to 1 to about 4 to 1 by weight. Preferably, however, the ratio should be from about 3 to 1 to about 3.5 to 1, i.e., if it is preferred that the alkali metal silicate solution contain 3 to 3.5 parts by weight of silica per part of alkali metal oxide.

The concentration of gelling agent employed is that sufficient to cause gelling of the silicate and can vary over a wide range depending on such variables as the temperature of the reservoir, the particular gelling agent used, the pH of the system and the gel time desired. In general, an aqueous solution containing from about 1 part by weight gelling agent per each part by weight alkali metal silicate used is satisfactory.

The treating method of this invention is carried out by positioning in the reservoir a mixture of a composition which forms a polymer gel and a composition which forms a silicate gel. It is preferred that the injected mixture penetrate into the more permeable strata a distance of at least about 20 feet from the injection well, and more preferably a distance of about 50 feet, although it is recognized that in some cases sufficient mixture can be injected to pass through the reservoir to one or more spaced producing wells, which can be located about 50 feet to several hundred feet or more from the injection well. It should be understood that the injectd mixture will penetrate into the less permeable zones to a much lesser extent, the amount of mixture entering each stratum depending upon the permeability of the individual stratum in relation to the permeabilities of all the strata.

The amount of mixture required to obtain the desired treatment will vary from well to well and can best be determined from a knowledge of the reservoir characteristics obtained from well logs, core analysis, injection profiles and tracer studies. Nevertheless, it is found that satisfactory results can often be obtained by the injection of about 5 to 500 barrels of aqueous mixture per vertical foot of formation to be treated, preferably about 15 to 100 barrels per vertical foot. The injected mixture comprises about 10 to 90 percent by volume of a polymer plugforming solution with the remainder being a silicate plug-forming solution. Preferably the mixture comprises about 25 to 75 percent by volume of a polymer plug-forming solution with the remainder being a silicate plug-forming solution. Most preferably, the mixture comprises about equal volumes of each plug-forming solution. The mixture can be premixed at the surface, as by mixing together the four components in a suitable mixing tank. Alternatively, two or more of the components can be premixed and injected separately and simultaneously with the other components. Mixing occurs during the passage of the solutions down the well and out into the reservoir. One convenient embodiment is to mix together a polymer solution and the material that reacts with the polymer to form a polymer gel to form one solution and to mix together a silicate solution and the material that reacts with the silicate to form a silicate gel to form another solution. The two solutions are then injected down the well simultaneously. Finally the well is shut in for a short period of time, say 8 to 24 hours or more to enable the plug to form.

After the treatment of this invention wherein there is formed in the heterogeneous reservoir a mixed polymer and silicate plug, the treated well can be returned to its intended use, such as for production of oil or for injection of secondary or tertiary recovery fluids. During this subsequent passage of fluids through the reservoir during production or injection, the fluids tend to pass through the less permeable portions of the reservoir rather than through the more permeable portions of the reservoir which are occupied by the plugging materials.

The mixed plug effectively plugs high permeability channels which have been difficult to plug with previously used plugging agents. While the reasons that this particular combination forms a superior plug are largely unknown and speculative, it is believed that each plugging material has certain unique characteristics that, when mixed, act together to form a more effective plug than does either plugging material used separately or two plugs formed individually. For example, a silicate gel by itself is relatively stiff. If the gel begins to deteriorate or starts to move in the reservoir due to the pressure exerted against it by the well fluids, the gel tends to break down. A polymer gel by itself remains flexible and sometimes eventually can be displaced from the channel in which it is formed, thus destroying the plug. A mixed polymer-silicate plug appears to retain its integrity and remain an effective plug for a longer period of time than does either a polymer plug alone, a silicate plug alone or the two individual plugs occupying the same channel.

The invention is further described by the following examples which are illustrative of specific modes of practicing the invention and are not intended as limiting the scope of the invention as defined by the appended claims.

EXAMPLE 1

The formation of a mixed polymer and silicate plug in a core is illustrated by the following laboratory test. A synthetic sand packed core is prepared using Nevada No. 130 sand, a rounded grain sand of sub-angular shape having the following particle size distribution: 4.9 percent by weight retained on a 100 mesh sieve, 39.1 percent retained on a 140 mesh sieve, 38.1 percent retained on a 200 mesh sieve, 12.1 percent retained on a 270 mesh sieve and 5.8 percent passing through a 270 mesh sieve. All sieves are U.S. Standard Screen Series. The sand is packed into a clear plastic cylindrical sleeve to form a core having a length of 4¾ inches and a diameter of 1½ inches. Permeable Aloxite discs are placed at each end of the sieve. The pore volume of the core is 48 milliliters. The core is mounted in a horizontal position. The core's permeability to water is 1,676 millidarcies. The flow rate of water through the core injected at a pressure of 2 pounds per square inch (p.s.i.) is 12.9 milliliters per minute (ml. per min.).

A plug-forming mixture is prepared by mixing together:
  a. 0.3 percent by weight SPX 5338 carboxymethylhydroxyethylcellulose polymer marketed by Hercules, Inc. and having a hydroxyethyl degree of substitution of 2.0 mole per mole, a carboxymethyl degree of substitution of 0.4 mole per mole and a viscosity of 46 centipoises in fresh water at a concentration of 0.25 percent by weight,
  b. 2 percent by weight ammonium sulfate,
  c. 50 weight parts per million chromic chloride,
  d. 1.5 percent by weight N-grade sodium silicate solution marketed by Philadelphia Quartz Company, an aqueous commercial sodium silicate containing about 37.6 percent by weight sodium silicate and having a silica to sodium oxide ($SiO_2$/$Na_2O$) ratio of 3.22, and
  e. remainder tap water.

1.9 pore volumes of the plug-forming mixture is injected into the sand packed core. The initial injection pressure is 2 p.s.i. As injection continues, it is necessary to raise the injection pressure first to 10 p.s.i. and then to 15 p.s.i. The core is allowed to stand for 72 hours for the plug to form. An attempt is then made to flow water through the core at gradually increasing pressure. As the water pressure against the core is increased from 2 p.s.i. to 26 p.s.i., no water flows through the core. When the pressure is increased to 27 p.s.i., water flows through the core at a rate of 0.067 ml. per min. When the water pressure is increased to 85 p.s.i., the water flow rate is 1.67 ml. per min. These results show that the formation of a mixed plug in the core greatly restricts the flow rate of water through the core.

EXAMPLE 2

The formation of a mixed polymer and silicate plug in a subterranean reservoir is illustrated by the following field example. A severe channel is known to exist between water injection well 12 and producing well 25 located 375 feet away therefrom in the East Coyote Field of Orange County, California. Well 12 has 8⅝ inch diameter casing extending from near the surface to a depth of 5,090 feet. The casing is perforated at various intervals between 2,830 feet and 4,667 feet. A perforated liner exists in the open hole below 5,090 feet to 5,225 feet. The well is equipped with 2½ inch tubing from the surface to 3,281 feet with a tubing-casing annulus packer at 3,281 feet. Previous tests of well 12 indicate the presence in the surrounding reservoir of a severe channel or thief sand at about 3,700 feet, which channel takes most of the injected water. A tracer test, wherein an aqueous solution of ammonium nitrate is blended into the injection water in well 12 and colorimetrically detected in well 25, shows that water injected into well 12 at the rate of about 700 barrels per day (B/D) reaches well 25 in one hour. Since 25 barrels of water are injected during the tracer test before being detected in well 25 and the combined tubing volume of the two wells is about 25 barrels, the volume of the channel must be quite small, probably about one barrel.

A mixed plug is formed in the channel by sequentially injecting down the tubing of well 12 at a pressure of about 600 p.s.i.g. the following solutions:

a. 85 barrels of a brine containing 5 percent by weight sodium chloride, b. 5 barrels of an aqueous solution containing 0.3 percent by weight SPX 5338 carboxymethylhydroxyethylcellulose (CMHEC) polymer, 50 weight parts per million (w.p.p.m.) chromic acetate, 2 percent by weight ammonium sulfate and remainder fresh water, which injection insures the presence in the reservoir of each of these three ingredients which, in some instances, tend to be absorbed out of solution onto the well equipment and the reservoir rock, c. 5 barrels fresh water inert spacer, d. 15.75 barrels of the composition of this invention prepared by mixing together at the surface an aqueous solution containing 3 percent by weight N-grade sodium silicate, 0.3 percent by weight SPX 5338 CMHEC polymer, 400 w.p.p.m. chromic acetate (cross-linking agent for polymer), 1.2 percent by weight ammonium sulfate (gelling agent for silicate) and remainder fresh water, and e. 5 barrels fresh water to displace the treating material farther into the reservoir.

Wells 12 and 25 are shut in for 48 hours to allow the mixed polymer-silicate plug to set. Well 12 is then returned to water injection at a rate of 700 B/D and well 25 is returned to production. One week following the placement of the plug a tracer test is made wherein a small amount of an aqueous solution containing 5.3 pounds per gallon ammonium nitrate is blended into the water being injected in well 12 at a rate of 700 B/D. The tracer is detected in well 25 only after 48 hours. This test indicates that the injected water is traveling a tortuous path through the reservoir and the severe channel between wells 12 and 25 has been successfully plugged.

The invention having been thus described, I claim:

1. A method for reducing the permeability of the higher permeability strata or channels of a heterogeneous subterranean reservoir penetrated by a well comprising simultaneously injecting through said well and into said reservoir about 5 to 500 barrels per vertical foot of strata to be treated of a mixture of the following compositions:

a. about 10 to 90 percent by volume of an aqueous solution or dispersion of a relatively high molecular weight polymer selected from the group consisting of acrylic acid-acrylamide copolymers, polyacrylamides, partially hydrolyzed polyacrylamides, polyalkyleneoxides, carboxyalkylcelluloses, hydroxyethylcelluloses and heteropolysaccharides obtained by the fermentation of starch-derived sugar, b. a cross-linking amount of an aqueous solution of a cross-linking agent for polymer selected from the group consisting of mixtures of a compound of a multivalent metal and a reducing agent, a low molecular weight watersoluble aldehyde, and a water-soluble salt of a polyvalent cation which reacts in solution to form a colloidal hydroxide, c. about 90 to 10 percent by volume of an aqueous solution of an alkali metal silicate, and d. a gelling amount of an aqueous solution of a gelling agent for silicate selected from the group consisting of acid and acid-forming compounds, watersoluble ammonium salts, lower aldehydes, aluminum salts and alkali metal aluminates, and shutting in the well until a mixed polymer-silicate plug has formed.

2. The method defined in claim 1 wherein said relatively high molecular weight polymer is employed at a concentration of from about 0.001 to about 1 percent by weight of the aqueous solution.

3. The method defined in claim 1 wherein said cross-linking agent is a mixture of a compound of a multivalent metal at a higher valence state and a reducing agent capable of reducing the multivalent metal to a lower valence state, and wherein the compound of the multivalent metal is employed at a concentration of from about 0.05 to 60 percent by weight of the polymer and the reducing agent is employed at a concentration of from about 0.1 to 150 percent by weight of the stoichiometric amount required to reduce the multivalent metal from said higher valence state to said lower valence state.

4. The method defined in claim 1 wherein said cross-linking agent is a low molecular weight water-soluble aldehyde employed at a concentration of from about 0.01 to 50 percent by weight of the polymer.

5. The method defined in claim 1 wherein said cross-linking agent is a water-soluble salt of a polyvalent cation which reacts in solution to form a colloidal hydroxide employed at a concentration of from about 0.005 to 5 percent by weight of the polymer.

6. The method defined in claim 1 wherein all of the said compositions are admixed at the surface before injection into the reservoir.

7. The method defined in claim 1 wherein any two or more of the said compositions are admixed at the surface and simultaneously injected into the reservoir along with the remaining compositions.

8. The method defined in claim 1 wherein each of the said compositions are injected separately and simultaneously.

9. The method defined in claim 1 wherein said alkali metal silicate is sodium silicate.

10. The method defined in claim 1 wherein said aqueous solution of alkali metal silicate contains from about 1 to 30 weight percent of said alkali metal silicate.

11. The method defined in claim 1 wherein said gelling agent is ammonium sulfate or ammonium bicarbonate.

12. The method defined in claim 1 wherein said gelling agent is employed at a concentration of one part by weight gelling agent per each part by weight alkali metal silicate employed.

13. The method defined in claim 1 wherein the alkali metal silicate solution and the gelling agent solution are admixed at the surface before injection into the reservoir.

14. The method defined in claim 1 wherein the alkali metal silicate solution and the gelling agent solution are injected into the reservoir as separate slugs.

15. The method defined in claim 1 wherein the relatively high molecular weight polymer is selected from the class consisting of an at least partially cationic polyacrylamide, an at least partially anionic polyacrylamide which has been partially hydrolyzed, and mixtures thereof.

16. In a method for the recovery of oil from a subterranean oil reservoir having strata of heterogeneous permeability and which is in communication with at least one producing well and at least one injection well, which method includes injection into the reservoir of a secondary or a tertiary recovery fluid via an injection well and recovery of oil via a production well, the improvement which comprises, at some point during the injection of the secondary or tertiary recovery fluid, introducing into the heterogeneous reservoir from about 5 to about 500 barrels per vertical foot of strata to be treated of a mixture of:
- a. about 10 to 90 percent by volume of an aqueous solution of a relatively high molecular weight polymer selected from the class consisting of acrylic acidacrylamide copolymers, polyacrylamides, partially hydrolyzed polyacrylamides, polyalkyleneoxides, carboxyalkylcelluloses, hydroxyethylcelluloses and heteropolysaccharides obtained by the fermentation of starch-derived sugar,
- b. a cross-linking amount of an aqueous solution of a cross-linking agent for polymer selected from the class consisting of mixtures of a compound of a multivalent metal and a reducing agent, a low molecular weight water-soluble aldehyde, and a water-soluble salt of a polyvalent cation which reacts in solution to form a colloidal hydroxide,
- c. about 90 to 10 percent by volume of an aqueous solution of an alkali metal silicate, and
- d. a gelling amount of an aqueous solution of a gelling agent for silicate selected from the group consisting of acid and acid-forming compounds, water-soluble ammonium salts, lower aldehydes, aluminum salts and alkali metal aluminates, and shutting in the well until a mixed polymer-silicate plug has formed.

17. The method defined in claim 16 wherein the relatively high molecular weight polymer is employed at a concentration of from about 0.001 to about 1 percent by weight of the aqueous solution.

18. The method defined in claim 16 wherein the cross-linking agent is a mixture of a compound of a multivalent metal and a reducing agent wherein the compound of a multivalent metal is employed at a concentration of from about 0.05 to 60 percent by weight of the polymer and the reducing agent is employed at a concentration of from about 0.1 to 150 percent by weight of the stoichiometric amount required to reduce the metal in a starting polyvalent state to a lower polyvalent state.

19. The method defined in claim 16 wherein the cross-linking agent is a low molecular weight water-soluble aldehyde employed at a concentration of from about 0.01 to 50 percent by weight of the polymer.

20. The method defined in claim 16 wherein the cross-linking agent is a water-soluble salt of a polyvalent cation which reacts in solution to form a colloidal hydroxide employed at a concentration of from about 0.005 to 5 percent by weight of the polymer.

21. The method defined in claim 16 wherein all of the said compositions are admixed at the surface before introduction into the reservoir.

22. The method defined in claim 16 wherein any two or more of the said compositions are admixed at the surface and simultaneously introduced into the reservoir along with the remaining compositions.

23. The method defined in claim 16 wherein each of the said compositions are introduced separately and simultaneously.

24. The method defined in claim 16 wherein the alkali metal silicate is sodium silicate.

25. The method defined in claim 16 wherein the alkali metal silicate is employed at a concentration of from about 1 to 30 weight percent of the aqueous solution.

26. The method defined in claim 16 wherein the gelling agent is ammonium sulfate or ammonium bicarbonate.

27. The method defined in claim 16 wherein the gelling agent is employed at a concentration of one part by weight gelling agent per each part by weight alkali metal silicate employed.

28. The method defined in claim 16 wherein the alkali metal silicate solution and the gelling agent solution are admixed at the surface before introduction into the reservoir.

29. The method defined in claim 16 wherein the alkali metal silicate solution and the gelling agent solution are introduced into the reservoir as separate slugs.

30. The method defined in claim 16 wherein the relatively high molecular weight polymer is selected from the class consisting of an at least partially cationic polyacrylamide, an at least partially anionic polyacrylamide which has been partially hydrolyzed, and mixtures thereof.

* * * * *